US007204413B2

(12) United States Patent
Huang et al.

(10) Patent No.: US 7,204,413 B2
(45) Date of Patent: Apr. 17, 2007

(54) JUDGMENT SYSTEMS AND METHODS

(75) Inventors: Po-Chang Huang, Changhua (TW); Wen-Tai Hsieh, Taipei (TW); Shih-Chun Chou, Taiepi (TW); Yung-Fang Yang, BeiTou Township, Changhua County (TW)

(73) Assignee: Institute for Information Industry, Taipei (TW)

( * ) Notice: Subject to any disclaimer, the term of this patent is extended or adjusted under 35 U.S.C. 154(b) by 183 days.

(21) Appl. No.: 11/040,243

(22) Filed: Jan. 21, 2005

(65) Prior Publication Data

US 2006/0124731 A1 Jun. 15, 2006

(30) Foreign Application Priority Data

Dec. 10, 2004 (CN) ................................ 93 1 38357

(51) Int. Cl.
*G06K 5/00* (2006.01)
*G06K 19/06* (2006.01)

(52) U.S. Cl. ...................................... 235/380; 235/492

(58) Field of Classification Search ................ 235/380, 235/381, 492, 493; 463/1, 11, 42; 273/292, 273/308, 430

See application file for complete search history.

(56) References Cited

U.S. PATENT DOCUMENTS

| | | | | |
|---|---|---|---|---|
| 6,656,039 | B2 * | 12/2003 | Yamada | 463/11 |
| 6,967,566 | B2 * | 11/2005 | Weston et al. | 340/323 R |
| 2001/0018358 | A1 * | 8/2001 | Yamada | 463/1 |
| 2003/0004887 | A1 * | 1/2003 | Roszak | 705/57 |
| 2005/0101386 | A1 * | 5/2005 | Lavanchy et al. | 463/42 |
| 2005/0178833 | A1 * | 8/2005 | Kisliakov | 235/441 |

* cited by examiner

*Primary Examiner*—Thien M. Le
(74) *Attorney, Agent, or Firm*—Thomas, Kayden, Horstemeyer & Risley

(57) ABSTRACT

Judgment systems and methods. The system includes a signal gathering module, an attribute retrieval module, a rule retrieval module, and a rule execution module. The signal gathering module receives identification of at least a first card and a second card, and defines statuses thereof. The attribute retrieval module retrieves attributes corresponding to the first and second cards according to the identification thereof. The rule retrieval module retrieves a rule according to the identification and statuses of the first and second cards. The rule execution module performs the rule on the first and second cards to change the attributes thereof.

26 Claims, 4 Drawing Sheets

JUDGMENT SYSTEMS AND METHODS

BACKGROUND

The present disclosure relates generally to judgment systems and methods, and more particularly, to systems and methods that detect a game environment and retrieve corresponding rules for judgment accordingly.

TGCs (Trading Card Games), such as "Magic the Gathering, MtG", in which respective players have different cards, each with a different attribute, and cards selected by one party are unknown to others, utilize a wide range of card combinations. Respective players can arrange a set of cards including a predetermined number of cards. During the game, players can select one card in one round. If all of the arranged cards for a player are used and corresponding attributes are decreased to zero, the player loses the game.

Since card combinations are varied, a large number of rules are required according to the cards and corresponding attributes. For example, during a round between two cards having different levels, a rule determines which can win the round and decreases the attribute, such as attack, of the losing card.

In conventional TCG, however, rules must be memorized and results judged manually. If matched cards are complicated, and corresponding rules are unknown, game play is suspended, causing inconvenience. Additionally, since cards for TCGs are normally collectable and valuable, conventional cards are easily counterfeited.

SUMMARY

Judgment systems and methods are provided. An exemplary embodiment of a judgment system, comprises a signal gathering module, an attribute retrieval module, a rule retrieval module, and a rule execution module. The signal gathering module receives identification for at least a first card and a second card, and defines statuses thereof. The attribute retrieval module retrieves attributes corresponding to the first and second cards according to the identification thereof. The rule retrieval module retrieves a rule according to the identification and statuses of the first and second cards. The rule execution module performs the rule on the first and second cards to change the attributes thereof.

In an exemplary embodiment of a judgment method, identification of at least a first card and a second card is received via at least one signal gathering module, and statuses thereof are defined. Attributes corresponding to the first and second cards are retrieved according to the identification thereof. A rule is retrieved according to the identification and statuses of the first and second cards. The rule is performed on the first and second cards to change the attributes thereof.

Judgment methods may take the form of program code embodied in a tangible media. When the program code is loaded into and executed by a machine, the machine becomes an apparatus for practicing the disclosed method.

DESCRIPTION OF THE DRAWINGS

Judgment systems and methods will become more fully understood by referring to the following detailed description with reference to the accompanying drawings, wherein.

DESCRIPTION

Judgment systems and methods are provided.

Figure 1:
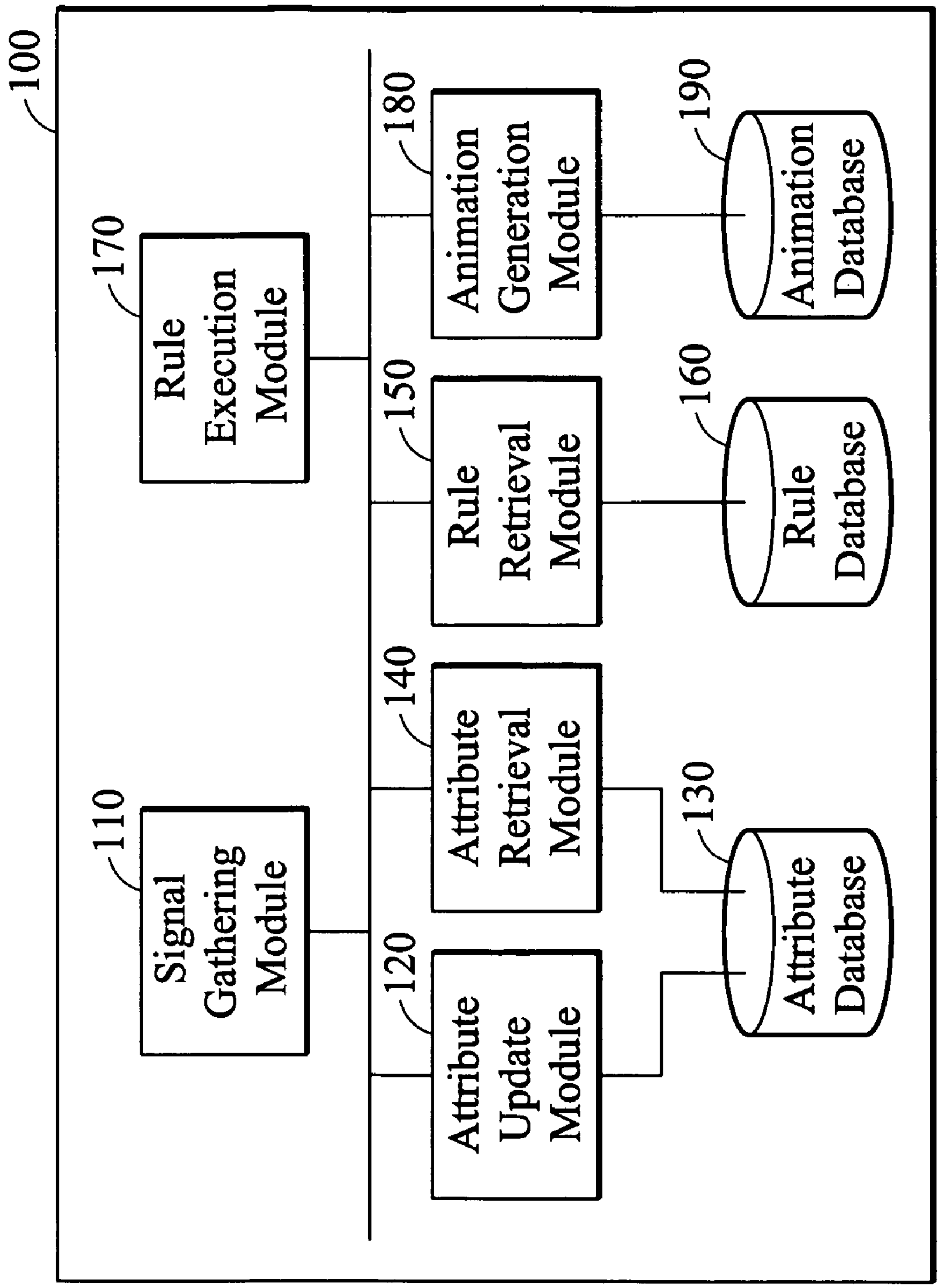
FIG. 1 is a schematic diagram illustrating an embodiment of a judgment system.

FIG. 1 is a schematic diagram illustrating an embodiment of a judgment system.

The judgment system 100 comprises at least one signal gathering module 110, an attribute update module 120, an attribute database 130, an attribute retrieval module 140, a rule retrieval module 150, a rule database 160, a rule execution module 170, an animation generation module 180, and an animation database 190.

Figure 2:
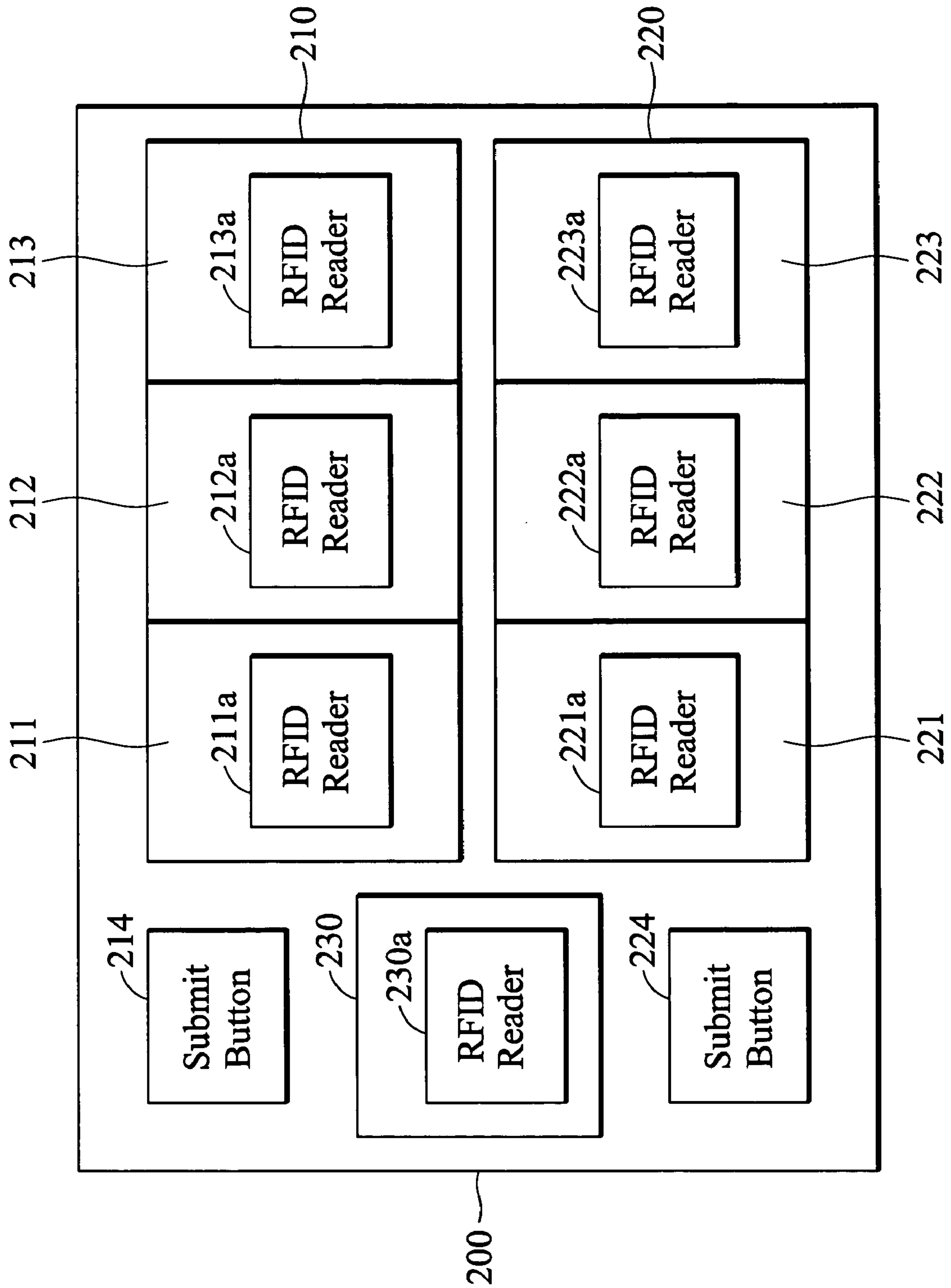
FIG. 2 is a schematic diagram illustrating an example of a game interface.

The signal gathering module 110 receives identification of cards, and status settings thereof. In some embodiments, respective cards have a unique RFID tag. The signal gathering module 110 comprises a RFID reader reading the RFID tags of cards. FIG. 2 is a schematic diagram illustrating an example of a game interface. In the game interface 200, blocks 210 and 220 are provided for respective players in game. Block 210 has card areas 211, 212, and 213 having different statuses. For example, cards with defense status can be put in the card area 211, cards with attack status can be put in the card area 212, and cards with covered status can be put in the card area 213. The cards with covered status can be opened during the game. Similarly, block 220 has card areas 221, 222, and 223 having different statuses. For example, cards with defense status can be put in the card area 221, cards with attack status can be put in the card area 222, and cards with covered status can be put in the card area 223.

In the example, respective card areas have a RFID reader, such as RFID reader 211*a* in card area 211, RFID reader 212*a* in card area 212, RFID reader 213*a* in card area 213, RFID reader 221*a* in card area 221, RFID reader 222*a* in card area 222, and RFID reader 223*a* in card area 223. Respective RFID readers predefine a specific status. When a card is put in a specific card area, and a submit button (214 or 224) is pressed, the corresponding RFID reader reads the identification of the card, and defines the status of the card as the specific status of the card area. Additionally, the game interface 200 further comprises another card area 230 having a RFID reader 230*a*. Cards eliminated from the game can be put in card area 230, with identification thereof read and registered through the RFID reader 230*a*, to prevent reuse of the cards in the game.

Figure 3:
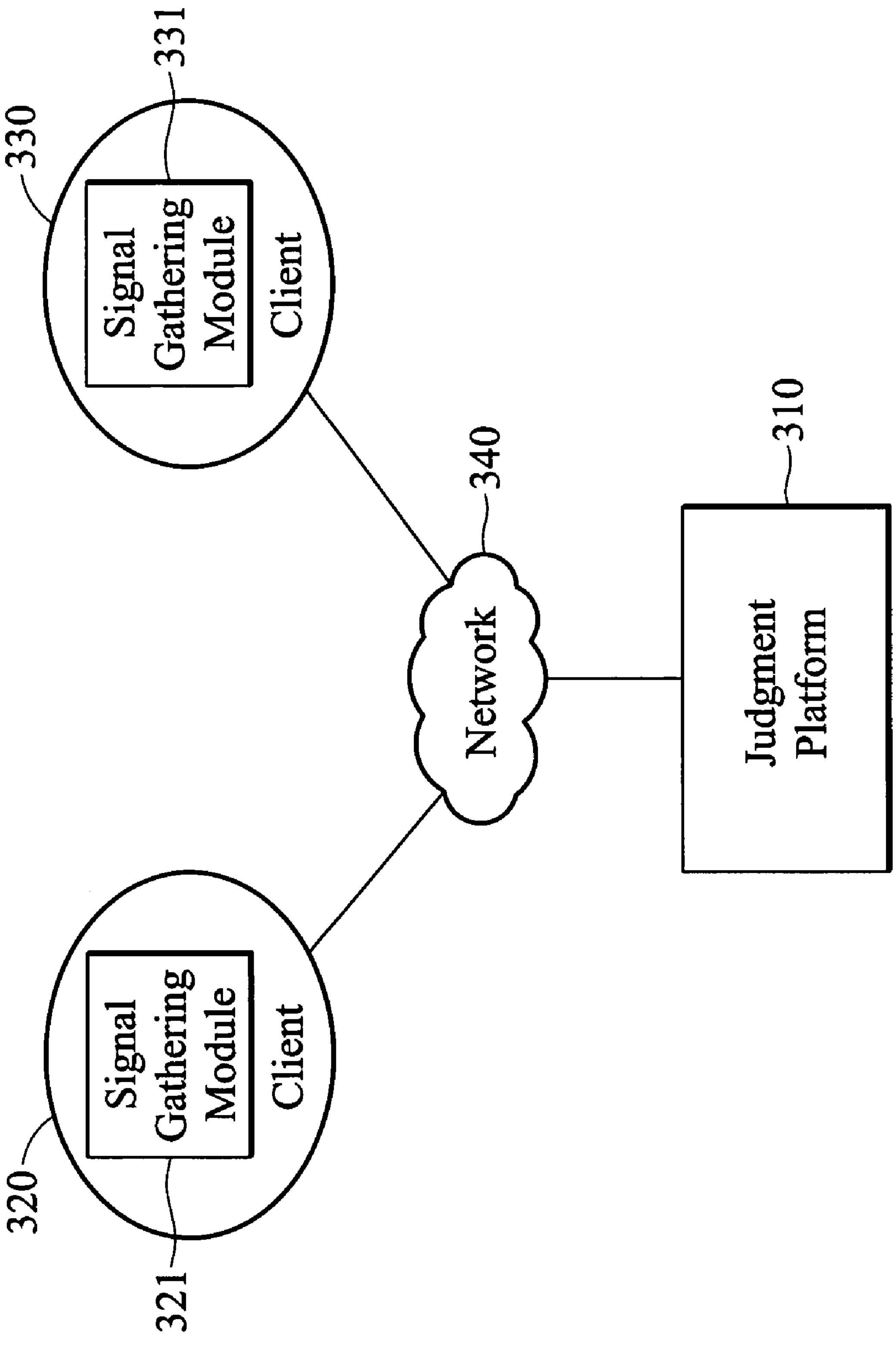
FIG. 3 is a schematic diagram illustrating an embodiment of a judgment system.

In some embodiments, players can join the game via a network. FIG. 3 is a schematic diagram illustrating an embodiment of a judgment system. As shown in FIG. 3, respective clients 320 and 330 have corresponding signal gathering modules 321 and 331. Clients 320 and 330 are coupled to a judgment platform 310 via a network 340. The judgment platform 310 has components similar to those of the judgment system in FIG. 1, but only the signal gathering module 110 is respectively set for clients 320 and 330. It is understood that respective clients can receive identification of a predetermined number of cards via the signal gathering module, and register the cards in the judgment platform 310 in advance. During the game, the judgment platform 310 determines whether a card is registered if identification corresponding to the card is received.

The attribute update module 120 receives attribute information of cards, and updates the attribute information to the attribute database 130. The attribute retrieval module 140 retrieves attributes of cards from the attribute database 130 according to the identification thereof. The attributes comprise attack strength, defense strength, vitality, and others. The rule retrieval module 150 retrieves rules according to the identification, statuses and/or attributes of the matched cards in the game. The matched cards are the cards selected and put on the game interface, but not eliminated. The rule execution module 170 performs the rule on the matched cards, to change the attributes thereof. The rule execution module 170 further determines whether to disable (eliminate) any of the matched cards according to the attributes thereof. If one card is disabled, the rule execution module 170 registers the identification of the disabled card. When the rule execution module 170 performs the rule, the animation generation module 180 retrieves animations from the animation database 190 according to the identification of the matched cards and the rule, and plays the retrieved animation. It is understood that if the game is played through a network, the result corresponding to changes in the attributes of the matched cards is transmitted to the clients. Additionally, the retrieved animations are transmitted to the clients for play.

Figure 4:
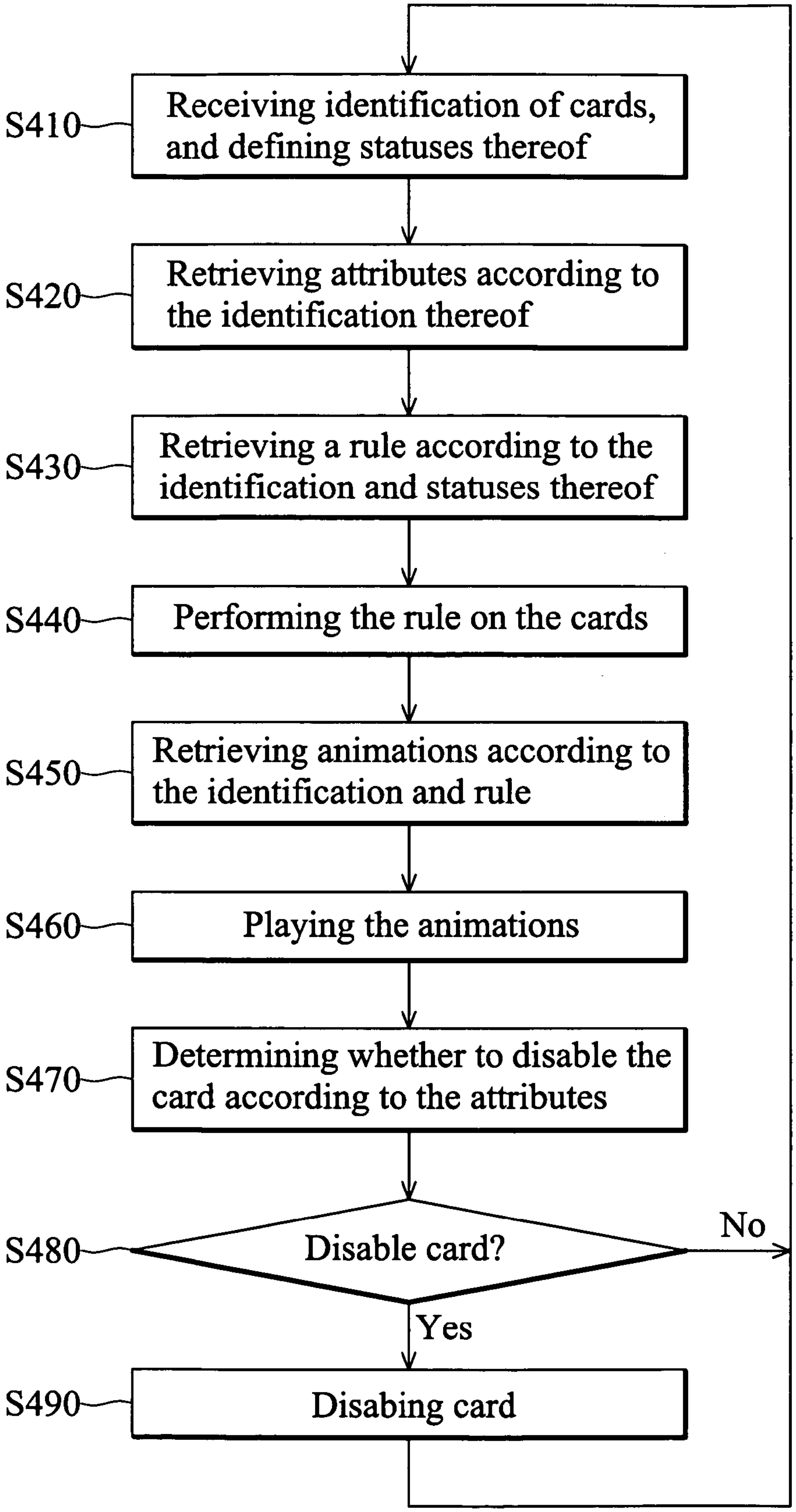
FIG. 4 is a flowchart of an embodiment of a judgment method.

FIG. 4 is a flowchart of an embodiment of a judgment method.

First, in step S410, identification of cards are received via at least one signal gathering module, and statuses thereof are defined. It is understood that, in step S410, the signal gathering module can receive identification of one or multiple cards. Respective signal gathering modules predefine a specific status. When a card is put in a card area having the signal gathering module, the status of the card is defined automatically. Additionally, if the game is played through a network, the respective client can receive identification of a predetermined number of cards via the signal gathering module, and register the cards in advance. During the game, it is determined whether a card is registered if the identification corresponding to the card is received. In step S420, attributes corresponding to the matched cards are retrieved according to the identification thereof.

In step S430, a rule is retrieved according to the identification, statuses and/or attributes of the matched cards, and in step S440, the rule is performed on the matched cards, to change the attributes thereof. It is understood that the rule defines the related cards and attributes involved in a round, and adjustment values of the attributes. At the same time, in step S450, animations are retrieved according to the identification of the matched cards and the rule, and in step S460, the animations are played. Then, in step S470, it is determined whether any of the cards are to be disabled according to the attributes thereof. If not (no in step S480), the procedure returns to step S410 for a subsequent game round. If so (yes in step S480), in step S490, the card is disabled, and the corresponding identification is registered to prevent reuse of the disabled card. Then, the procedure returns to step S410 for a subsequent game round.

Judgment methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A judgment system, comprising:

at least one physical game interface comprising at least one card area for placing at least a first card and a second card;

at least one signal gathering module receiving identification of the first card and the second card, and defining statuses thereof;

an attribute retrieval module retrieving attributes corresponding to the first and second cards according to the identification thereof;

a rule retrieval module retrieving a rule according to the identification and statuses of the first and second cards; and a rule execution module performing the rule on the first and second cards to change the attributes thereof.

2. The system of claim 1 wherein the rule retrieval module further retrieves the rule according to the identification, statuses and attributes of the first and second cards.

3. The system of claim 1 further comprising an animation generation module retrieving at least one animation according to the identification of the first and second cards and the rule, and playing the retrieved animation.

4. The system of claim 1 wherein the rule execution module further determines whether to disable any of the first and second cards according to the attributes thereof.

5. The system of claim 4 wherein the rule execution module further registers the identification of the disabled card.

6. The system of claim 1 further comprising an attribute update module updating the attributes of any of the first and second cards.

7. The system of claim 1 wherein each of the first and second cards has a RFID, and the signal gathering module comprises a RFID reader reading the RFIDs corresponding to the first and second cards.

8. A judgment system, comprising:

a first client, comprising:

a physical game interface comprising at least one card area for placing at least a first card; and a first signal gathering module receiving identification of the first card, and defining status thereof;

a second clients, comprising:

a physical game interface comprising at least one card area for placing at least a second card; and a second signal gathering module receiving identification of the second card, and defining status thereof; and a judgment platform coupled to the first client and the second client via a network, receiving the identification and statuses of the first and second cards from the first and second signal gathering modules, the judgment platform comprising:

an attribute retrieval module retrieving attributes corresponding to the first and second cards according to the identification thereof;

a rule retrieval module retrieving a rule according to the identification and statuses of the first and second cards; and a rule execution module performing the rule on the first and second cards to change the attributes thereof.

9. The system of claim 8 wherein the rule retrieval module further retrieves the rule according to the identification, statuses and attributes of the first and second cards.

10. The system of claim 8 wherein the judgment platform further comprises an animation generation module retrieving at least one animation according to the identification of the first and second cards and the rule, and transmitting the retrieved animation to the first and second clients for play.

11. The system of claim 8 wherein the rule execution module further determines whether to disable any of the first and second cards according to the attributes thereof.

12. The system of claim 11 wherein the rule execution module further registers the identification of the disabled card.

13. The system of claim 8 wherein the judgment platform further comprises an attribute update module updating the attributes of any of the first and second cards.

14. The system of claim 8 wherein each of the first and second cards has a RFID, and each of the first and second signal gathering modules comprises a RFID reader reading the RFIDs corresponding to the first and second cards.

15. The system of claim 8 wherein the rule execution module further transmits a result corresponding to change of the attributes of the first and second cards to the first and second clients.

16. The system of claim 8 wherein the first and second clients further receive identification of a predetermined number of cards via the first and second signal gathering module respectively, and register the cards in the judgment platform in advance.

17. The system of claim 16 wherein the judgment platform further determines whether a card is registered if the identification corresponding to the card is received.

18. Ajudgment method, comprising:

receiving identification of at least a first card and a second card via at least one signal gathering module, and defining statuses thereof, where the first card and the second card are placed in at least one card area of a physical game interface;

retrieving attributes corresponding to the first and second cards according to the identification thereof;

retrieving a rule according to the identification and statuses of the first and second cards; and performing the rule on the first and second cards to change the attributes thereof.

19. The method of claim 18 further comprising retrieving the rule according to the identification, statuses and attributes of the first and second cards.

20. The method of claim 18 further comprising retrieving at least one animation according to the identification of the first and second cards and the rule, and playing the retrieved animation.

21. The method of claim 18 further comprising determining whether to disable any of the first and second cards according to the attributes thereof.

22. The method of claim 21 further comprising registering the identification of the disabled card.

23. The method of claim 18 further comprising updating the attributes of any of the first and second cards.

24. The method of claim 18 wherein each of the first and second cards has a RFID, and the signal gathering module comprises a RFID reader reading the RFIDs corresponding to the first and second cards.

25. The method of claim 18 further comprising receiving identification of a predetermined number of cards via the signal gathering module, and registering the cards in advance.

26. The method of claim 25 further comprising determining whether a card is registered if the identification corresponding to the card is received.

* * * * *